United States Patent [19]

Fletcher

[11] 4,016,899
[45] Apr. 12, 1977

[54] RELIEF VALVE
[75] Inventor: Willard J. Fletcher, Dallas, Tex.
[73] Assignee: Fitting, Valve & Control Corporation, Dallas, Tex.
[22] Filed: Dec. 10, 1975
[21] Appl. No.: 639,285
[52] U.S. Cl. .............................. 137/115; 137/540; 137/599
[51] Int. Cl.² ...................................... F16K 11/10
[58] Field of Search .......... 137/115, 540, 110, 599; 239/126; 222/318, 424

[56] References Cited
UNITED STATES PATENTS

| 1,577,446 | 3/1926 | Brown | 137/599 X |
|---|---|---|---|
| 1,711,013 | 4/1929 | Bryant | 137/540 X |
| 2,160,028 | 5/1939 | Moore | 137/115 |
| 2,558,687 | 6/1951 | Krueger | 137/599 |
| 2,600,554 | 6/1952 | Lyons | 137/115 X |
| 2,662,543 | 12/1953 | Stacey | 137/115 |
| 2,687,742 | 8/1954 | Crookston | 137/115 |
| 2,959,188 | 11/1960 | Kepner | 137/540 |

Primary Examiner—Robert G. Nilson
Attorney, Agent, or Firm—Howard E. Moore; Gerald G. Crutsinger

[57] ABSTRACT

A relief valve to relieve excessive pressure on a flexible transfer hose used for transferring fluid material such as anhydrous ammonia when the valves on each end of the hose are closed. The gas expands and the relief valve bypasses the tank valve to relieve excessive pressure buildup in the hose. The relief valve vents such excessive pressure back into the tank supply chamber and not to the ambient atmosphere.

6 Claims, 2 Drawing Figures

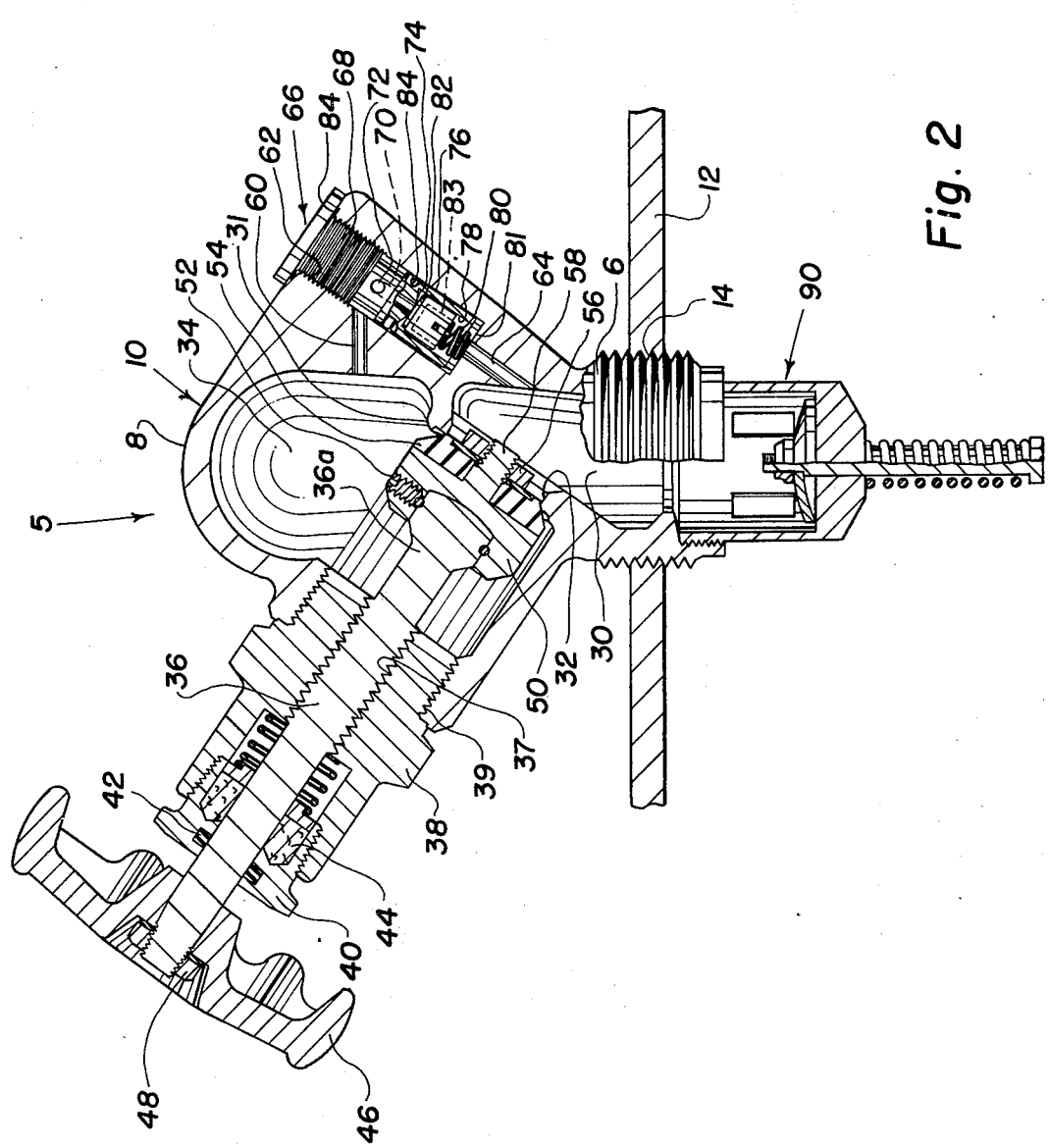

100
RELIEF VALVE

BACKGROUND

Various chemicals used today are transferred from supply tanks to smaller usable tanks by means of a flexible hose. The supply tank usually has a manual tank valve which controls the flow into the hose and the hose usually has a flow control nozzle valve for a temporary shutoff.

Various chemicals such as anhydrous ammonia which is shipped under a concentrated condition are transferred from a supply tank to a smaller container for transport and use. When the manual tank valve is shut off and the nozzle control valve is shut off, a small amount of concentrated gas is trapped within the hose. Over a period of time, if the hose is allowed to remain in the sun or under a heated condition, the gas will expand, creating excessive pressure upon the hose which may cause the hose to burst. Chemicals such as anhydrous ammonia or the like are highly dangerous when inhaled or can be dangerous to skin contact and flying debris is hazardous to personnel. Therefore an exploding hose would create an undue hazard to transfer operators.

Other safety valves vent the excessive gas from the hose into the surrounding atmosphere exposing personnel to the hazardous gas.

SUMMARY

I have devised a pressure relief valve which communicates with the outlet of the manual tank valve such that excessive pressure will open the pressure relief valve which is vented into the inlet of the manual tank valve communicating with the supply tank. Therefore excessive pressure is returned to the supply tank before the maximum pressure of the hose is exceeded by expanding gas.

The manual tank valve comprises a body having an outlet and an inlet with a gate type valve for opening the passage between the inlet and outlet. The pressure relief valve bypasses the gate valve to vent excessive pressure in the outlet and hose back to the supply tank.

The primary object of the invention is to provide a safety relief valve which would permit excessive pressure from bursting the transfer hose when transferring concentrated gases.

A still further object of the invention is to provide a simple, effective safety device which will vent excessive pressure back into the supply chamber, thus preventing any exposure of the gas to the surrounding area which might endanger personnel.

A still further object of the invention is to provide an automatic safety relief when the supply hose is left unattended by the operator such that gas left in the hose may be vented back to the supply chamber.

Other and further objects of the invention will become apparent upon reading the detailed description hereinafter following and by referring to the drawings annexed hereto.

DESCRIPTION OF THE DRAWINGS

Drawings of a preferred embodiment of the invention are annexed hereto so that the invention may be better and more fully understood, in which:

FIG. 2 is a cross-sectional view taken along line 2—2 of FIG. 1.

Numeral references are used to designate elements in the drawings and like numeral designate like elements throughout the various figures of the drawing.

DESCRIPTION OF A PREFERRED EMBODIMENT

Figure 1:
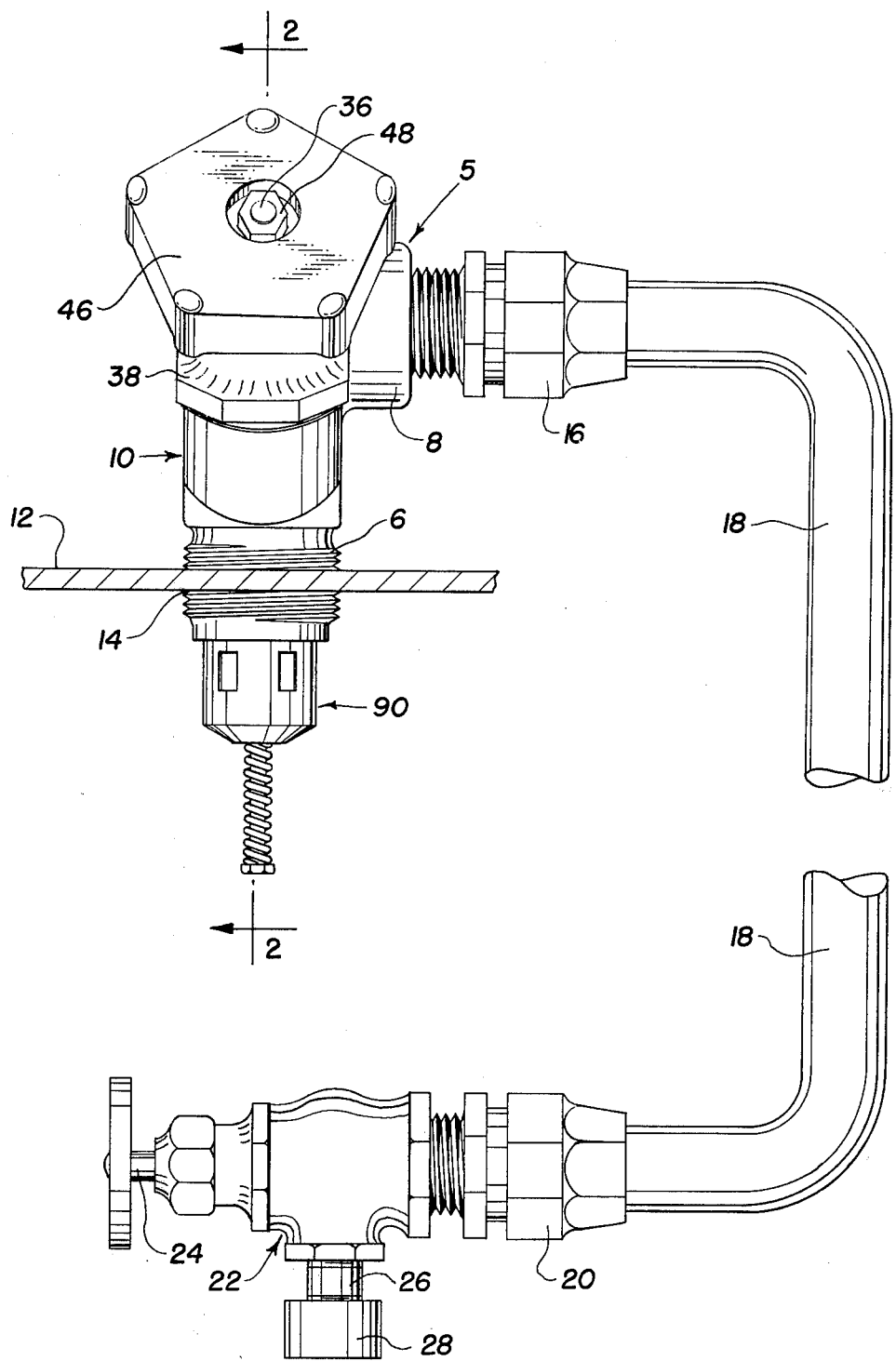
FIG. 1 is an elevational view illustrating the manual tank cutoff valve and transfer hose with nozzle cutoff valve attached thereto.

Referring to FIG. 1 of the drawings, the numeral 5 generally designates a manual tank valve having an inlet 6 and outlet 8 formed in the body 10. The inlet 6 has threads on the end thereof which threadedly engage the top of a supply tank 12 having a passage 14 formed therein.

A first end of flexible hose 18 is secured to the outlet port 8 by hose coupling 16 threadedly secured thereto. The second end of flexible hose 18 is secured to a male hose coupling 20 which is threadedly secured to an angle valve 22 having a stem 24 and an outlet port 26. The angle valve 22 is a typical type of hose shutoff valve used in transferring chemicals such as anhydrous ammonia such as Model No. AL 413 manufactured by Squibb-Pitzer of Dallas, Texas. The outlet port 26 has a standard coupling 28 threadedly secured thereto such as manufactured by Squibb-Pitzer of Dallas, Texas, Model No. A 1149F which threads to a container (not shown) from which the chemical is distributed.

Referring to FIG. 2 of the drawings, the valve 5 has an inlet passage 30. A partition 31 separates the inlet 30 and outlet 34 having a valve port 32 formed therein.

A stainless steel stem 36 is threadedly disposed through stem holder 38 and bushing 40 secures seal 42 and packing 44 against stem 36 to prevent leakage. Handle 46 is rigidly secured to stem 36 by nut 48 to turn the valve stem 36. End 36a of stem 36 is secured to a free wheeling ball bearing swivel seat disc retainer 50 by set screw 52.

A replaceable disc seat 54 is secured to the disc retainer 50 by nut 56 which is threadedly secured to a threaded extension 58 of disc retainer 50.

It should be readily apparent from the foregoing that turning handle 46 rotates stem 36. Stem 36 has threads 37 thereon which move longitudinally in internal threads 39 of stem holder 38 moving the seat 54 off to valve port 32. Fluid may then flow through port 32 into outlet passage 34 which communicates with hose 18. When stem 24 is rotated valve 22 is opened and chemical flows through shut-off angle valve 22 to coupling 28 and to the dispensing container (not shown) being supplied with chemical. When valve 22 and port 30 are closed chemicals may remain in the hose 18 between valves 5 and 22.

A port 60 is formed in body 10 between the outlet passage 34 and a bore 62. Bore 62 communicates with passage 64 which communicates with inlet passage 30.

A relief valve assembly 66 including a valve holder body 68 is threadedly secured in bore 62 which has a hollow bore 70 formed therein communicating with passage 60 through aperture 72. A valve seat 74 is formed in the end of bore 70 between the inlet and outlet passages. A valve element such as a piston 76 having a resilient end 82 thereon is slideably disposed in counterbore 78 of valve body 68. A spring 80 is disposed between shoulder 81 and counterbore 83 in piston 76 to urge piston 76 against valve seat 74. Piston 76 comprises a hollow cylindrical member having an open end to receive the spring 80 and a closed end to abutt spring 70.

Excessive pressure from hose 18 communicates through outlet passage 34 and through passage 60, apertures 72, and bore 70 against piston 74 urging piston 76 off of valve seat 74 allowing the pressure to pass through passage 64 into inlet passage 30. Seals 84 are provided to prevent escape of pressure behind valve body 68.

A conventional excess flow check valve 90 which closes at a predetermined pressure differential is threadedly secured in inlet 6 of tank valve 5 to prevent excessive flow out of tank 12.

It should be readily apparent that when pressure in hose 18 exceeds the pressure at which valve 76 opens such that excess pressure will pass into outlet passage 34 through pressure relief assembly 66 into inlet passage 30 and back into tank 12 through excessive flow valve 90 without venting the dangerous gas to atmosphere and preventing rupture of hose 18.

It should be readily apparent that from the foregoing objects of the invention have been accomplished and that other embodiments of the invention may be devised without departing from the basic concept thereof.

It should be readily apparent that the bore 62 and relief valve assembly 68 having bore 70 form a bypass passage between the inlet 30 and outlet 34 through which excessive pressure is passed through the check valve or valve element 76.

Having described my invention, I claim:

1. In a tank shut-off valve; a body having an inlet passage and an outlet passage with a valve port formed therebetween, said body having a bore formed therein; a first passage in the body between the bore and the outlet passage; a second passage in the body between the bore and the inlet passage; a valve seat in said port; a valve member arranged to seat on said valve seat and moveable from a position opening said valve port to a position closing said valve port; a relief valve assembly detachably secured in said bore having a portion with a second port formed therethrough communicating with the first passage and the second passage; a resilient valve member arranged to be urged against said second port to close same; resilient means urging said valve member against said second port until a predetermined pressure from said outlet passage is exerted through said first passage and through said second port formed in said relief valve assembly against said valve member to overcome the resilient means to urge said valve member away from said second port to release the pressure within said outlet passage, allowing said pressure to pass through said second passage into said inlet passage.

2. The combination called for in claim 1 with the addition of a hose secured to the outlet of said valve, said hose having a shut-off valve attached to the outer end thereof.

3. A tank shut-off valve for dispensing toxic material through a flexible hose having a first end secured to the shut-off valve and the second end of the hose having a nozzle valve thereon, said shut-off valve comprising: a body having a bore formed therein and an inlet and outlet, the hose being connected to the outlet; a partition formed in the bore of the body having a valve portal formed therethrough; a valve member in said body moveable between a position opening said valve portal and closing said valve portal; said body having a passage formed therein between the inlet and outlet formed in said body; a valve seat formed in said passage; a valve element; and resilient means adapted to urge said valve element onto said valve seat, said valve element being adapted to open when pressure in said flexible hose exceeds a predetermined pressure allowing the excess material to return to the tank through the inlet.

4. The combination called for in claim 3 wherein the valve element comprises: a hollow cylindrical member having an open end to receive resilient means; a closed end; and resilient seal means secured to said closed end, arranged to engage said valve seat.

5. The combination called for in claim 4 wherein the resilient means comprises: a spring disposed between an open end of said hollow cylindrical member and the outlet passage.

6. The combination called for in claim 3 wherein the valve member comprises a stem moveably secured in an aperture formed in the body; seal means disposed between the stem and body; and a valve disc secured to the stem to engage the portal.

* * * * *